United States Patent [19]
Kikuchi et al.

[11] Patent Number: 6,030,260
[45] Date of Patent: Feb. 29, 2000

[54] CONNECTING TERMINAL FOR STATOR

[75] Inventors: Shinji Kikuchi; Masaharu Moriuchi; Tatsuya Mori; Shigeyoshi Kubota, all of Nitta; Tsutomu Hirano, Wako; Motohiro Shimizu, Wako; Yasuhiro Shinkawa, Wako, all of Japan

[73] Assignees: Sawafuji Electric Co., Ltd.; Honda Giken Kogyo Kabushiki Kaisha, both of Tokyo, Japan

[21] Appl. No.: 09/186,420

[22] Filed: Nov. 5, 1998

[30]  Foreign Application Priority Data

Nov. 13, 1997  [JP]  Japan .................................... 9-311835

[51] Int. Cl.[7] .................................................. H01R 13/02
[52] U.S. Cl. ............................ 439/890; 310/71; 439/174
[58] Field of Search .................................. 439/174, 890, 439/874; 310/71

[56]  References Cited

U.S. PATENT DOCUMENTS 3,760,339  9/1973  Marshall ................................. 439/890
3,780,323  12/1973  Swain ........................................ 310/71
3,787,799  1/1974  McFarlane ............................. 439/890

FOREIGN PATENT DOCUMENTS 9-93849  4/1997  Japan .
2232011  11/1990  United Kingdom ................... 439/174

*Primary Examiner*—Gary F. Paumen
*Attorney, Agent, or Firm*—Nikaido, Marmelstein, Murray & Oram LLP

[57]  ABSTRACT

A connecting terminal for a stator which is fitted and fixed in a fitting bore provided in a bobbin included in the stator, includes an external-conductor connecting terminal section fitted and fixed in the fitting bore with one end connected to an external conductor protruding from the fitting bore, a flat plate-shaped connecting plate section connected at one end at right angles to the other end of the external-conductor connecting terminal section and extending outwards in a radial direction of the stator, and a coil connecting terminal section which extends away from the bobbin and which is connected at right angles to the other end of the connecting plate section, so that the coil connecting terminal section can be folded to a position superposed onto the connecting plate section. The coil connecting terminal section is formed into a tubular shape, so that a lead wire extending from the coil can be inserted through the coil connecting terminal section and can be connected to a tip end of the coil connecting terminal section by fusing. With such arrangement, the operation for connecting the coil to the connecting terminal can be easily carried out, whereby the number of steps of the connecting operation can be reduced, and the space for disposition of the connecting terminal can be reduced in size.

4 Claims, 9 Drawing Sheets

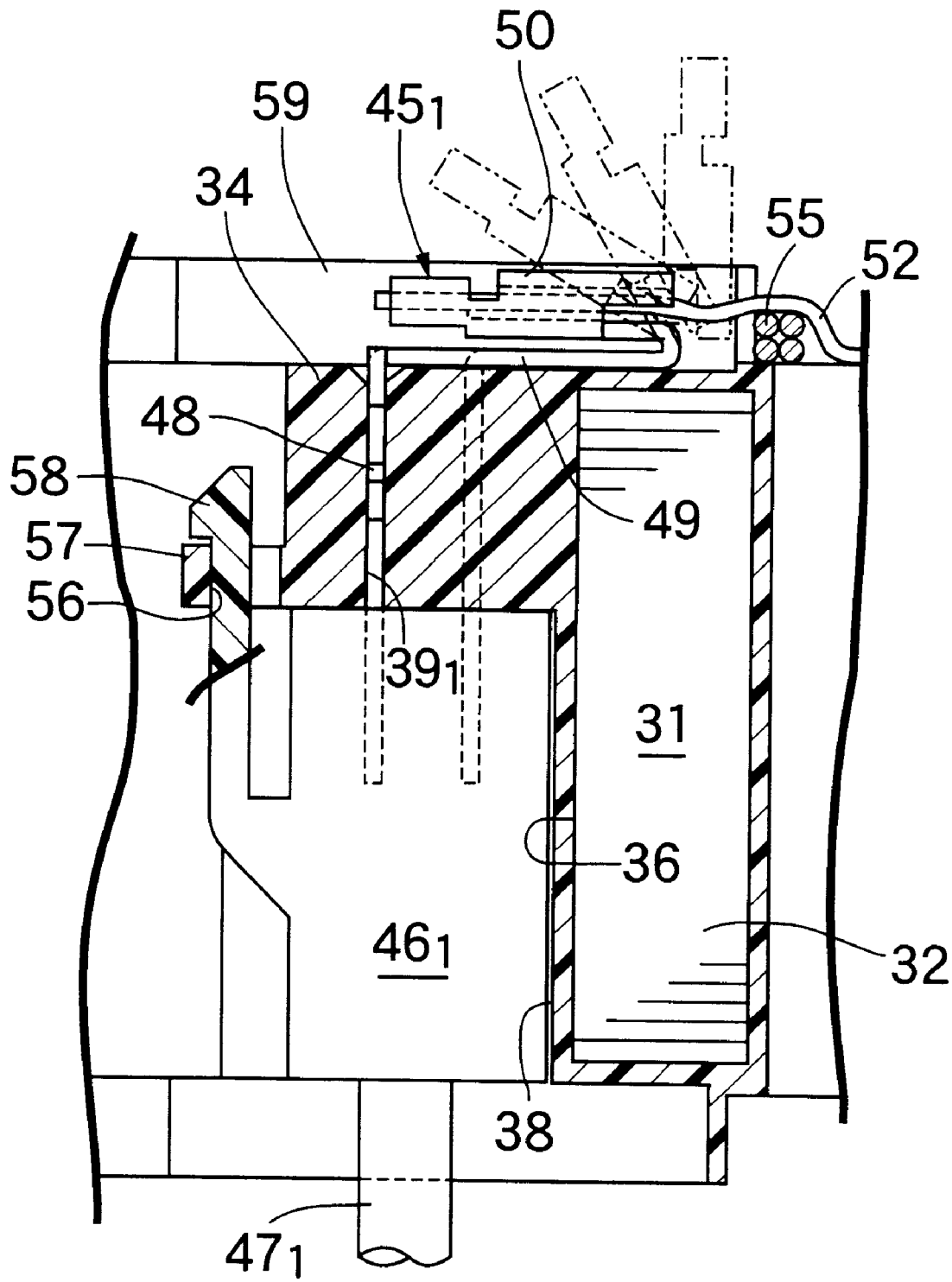

CONNECTING TERMINAL FOR STATOR

BACKGROUND OF THE INVENTION

1. Field of the Invention

The present invention relates to a connection terminal for a stator, which is fitted and fixed in a fitting bore provided in a bobbin included in a stator in order to connect a coil of the stator and an external conductor to each other.

2. Description of the Related Art

Such connecting terminals for stators are conventionally known from Japanese Patent Application Laid-open No. 9-93849 and the like, wherein a coil is connected to the connecting terminal by soldering.

It is common that a so-called magnet wire covered with an insulating skin is used for the coil. In a connecting terminal to which a coil is connected by soldering as in the above known connecting terminal, an operation for peeling off the insulating skin of the magnet wire is required before the soldering, making troublesome the operation for connecting the coil to the terminal member and resulting in an increased number of steps of the connecting operation.

To ensure that the operation for peeling off the insulating skin of the magnet wire is not required, it is conceived that the coil is connected to the connecting terminal by fusing. However, to connect the coil to the connecting terminal by fusing, it is required that a coil connecting section of the connecting terminal be disposed at a location relatively spaced apart from the bobbin, and if the connecting terminal remains protruding from the stator, the space for disposition of the connecting terminal is increased.

SUMMARY OF THE INVENTION

Accordingly, it is an object of the present invention to provide a connecting terminal for a stator, that allows the operation for connecting the coil to the connecting terminal to be carried out easily, whereby the number of steps of the connecting operation can be reduced, and the space for disposition of the connecting terminal can be reduced in size.

To achieve the above object, according to a first aspect and feature of the present invention, there is provided a connecting terminal for a stator, the connecting terminal is fitted and fixed in a fitting bore provided in a bobbin included in the stator for connection between a coil of the stator and external-conductor, the connecting terminal comprises an external-conductor connecting terminal section fitted and fixed in the fitting bore with one of opposite ends thereof connected to the external conductor protruding from the fitting bore, a flat plate-shaped connecting plate section connected at one end at right angles to the other end of the external-conductor connecting terminal section and extending outwards in a radial direction of the stator, and a coil connecting terminal section connected at right angles to the other end of the connecting plate section and extending away from the bobbin, so that the coil connecting terminal section can be folded to a position superposed onto the connecting plate section, the coil connecting terminal section being formed into a tubular shape, so that a lead wire extending from the coil can be inserted through the coil connecting terminal section and can be connected to a tip end of the coil connecting terminal section by fusing.

With such arrangement, the lead wire is connected by fusing to a tip end of the coil connecting terminal section, i.e., to the coil connecting terminal section at a location relatively spaced apart from the bobbin in a state in which the lead wire from the coil has been inserted through the coil connecting terminal section connected at right angles to the connecting plate section. Thus, even if the coil is formed from a magnet wire, the connection of the coil to the terminal can be easily carried out without the operation for peeling off the insulating skin. Therefore, the connecting operation is facilitated, and the number of steps of the operation can be reduced. In addition, after connection of the lead wire, the coil connecting terminal section can be folded so that it is superposed onto the connecting plate section, and the protrusion of the coil connecting terminal section from the stator can be avoided, whereby the space for disposition of the connecting terminal can be reduced in size.

According to a second aspect and feature of the present invention, in addition to the first feature, the coil connecting terminal section includes a connecting portion on its tip end side for connecting the lead wire by fusing, and an introducing portion for insertion of the lead wire therethrough toward the connecting portion, the connecting portion and the introducing portion being formed on the coil connecting terminal section with a window facing outwards of the stator being interposed therebetween. With such arrangement, when the coil connecting terminal section is folded, the introducing portion is pushed radially inwards of the stator, and a stress produced during folding is prevented from being applied to the connecting portion to which the lead wire has been connected by fusing. Thus, the connection of the coil connecting terminal section and the lead wire can be reliably maintained despite the folding.

According to a third aspect and feature of the present invention, in addition to the first or second feature, notches are provided on opposite sides of the coil connecting terminal section at a connection to the connecting plate section. With such arrangement, the coil connecting terminal section can be easily folded so that it is not crushed. Thus, it is possible to prevent a large load from being applied to the lead wire by crushing of the coil connecting terminal section.

The above and other objects, features and advantages of the invention will become apparent from the following description of the preferred embodiment taken in conjunction with the accompanying drawings.

BRIEF DESCRIPTION OF THE DRAWINGS

FIGS. 1 to 8 show a first embodiment of the present invention, wherein

FIG. 1 is a vertical sectional view of an outer rotor-type multi-pole erator, taken along a line 1—1— in FIG. 2;

FIG. 2 is a plan view of a stator taken in a direction of an arrow 2—2 FIG. 1;

FIG. 3 is a back view of a stator taken in a direction of an arrow 3—3 in FIG. 1;

FIG. 4 is an enlarged sectional view taken along a line 4—4 in FIG. 2 in a coupler-connected state;

FIG. 5 is a diagram of a coil connecting circuit;

FIG. 6 is a perspective view of an terminal;

FIG. 7 is a front view of the terminal taken in a direction of an arrow 7 in FIG. 6;

FIG. 8 is a side view of the terminal taken in a direction of an arrow 8 in FIG. 7; and FIG. 9 is a sectional view similar to FIG. 4, but according to a second embodiment of the present invention.

DETAILED DESCRIPTION OF THE PREFERRED EMBODIMENTS

The present invention will now be described by way of embodiments with reference to the accompanying drawings.

Figure 1:
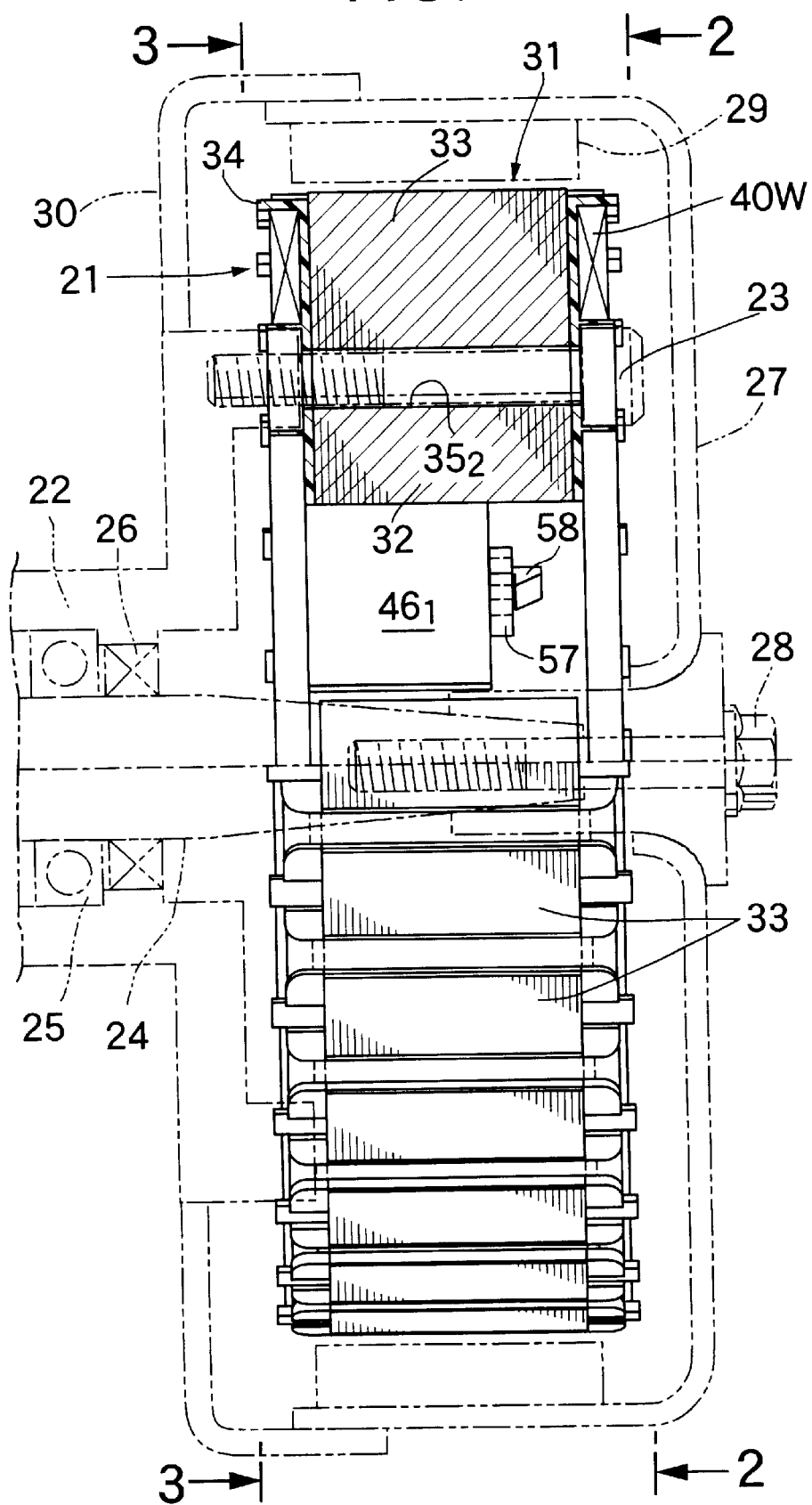

FIGS. 1 to 8 show a first embodiment of the present invention. Referring first to FIG. 1, a stator 21 of an outer rotor-type multi-pole generator is coupled to a sleeve 22 connected to an engine body by a plurality of, e.g., four bolts 23, and a crankshaft 24 of an engine which is not shown is coaxially disposed within the sleeve to coaxially pass through the stator 21. A bearing 25 and a seal member 26 are mounted between the sleeve 22 and the crankshaft 24. A rotor yoke 27 formed into a bowl-shape is coaxially fastened to an end of the crankshaft 24 by a bolt 28 to cover the stator 21, and a magnet 29 is secured to an inner periphery of the rotor yoke 27 to coaxially surround the stator 21 and to define a small air gap between the magnet 29 and the stator 1. A cover 30 is secured to the sleeve 22 to cover an opened end of the rotor yoke 27.

The stator 21 includes a stator core 31 formed from a plurality of core plates laminated on one another. The stator core 31 comprises a plurality of, e.g., 27 substantially T-shaped protruding poles 33 projectingly provided around an outer periphery of a core base portion 32 formed into a ring-shape.

The plurality of core plates constituting the stator core 31 are partially covered with a bobbin 34 made of a synthetic resin over between opposite ends in a laminating direction, whereby the core plates are retained in a mutually laminated state to constitute the stator core 31. The bobbin 34 is formed so as to cover the stator core 31 over between axially opposite ends thereof in such a manner that tip ends of the protruding poles 33 and a partial inner peripheral surface of a core base portion 32 are exposed.

Figure 2:
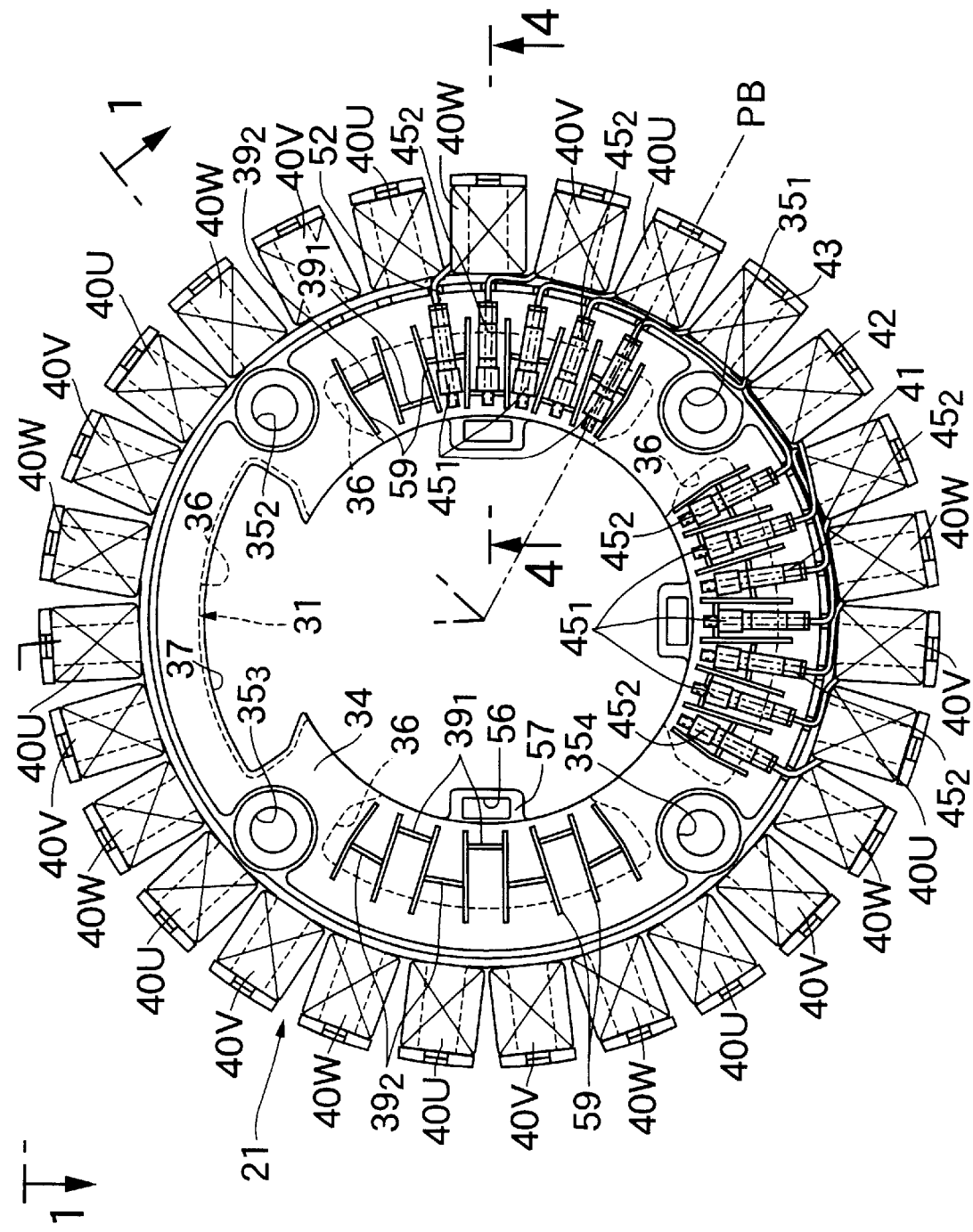
Figure 3:
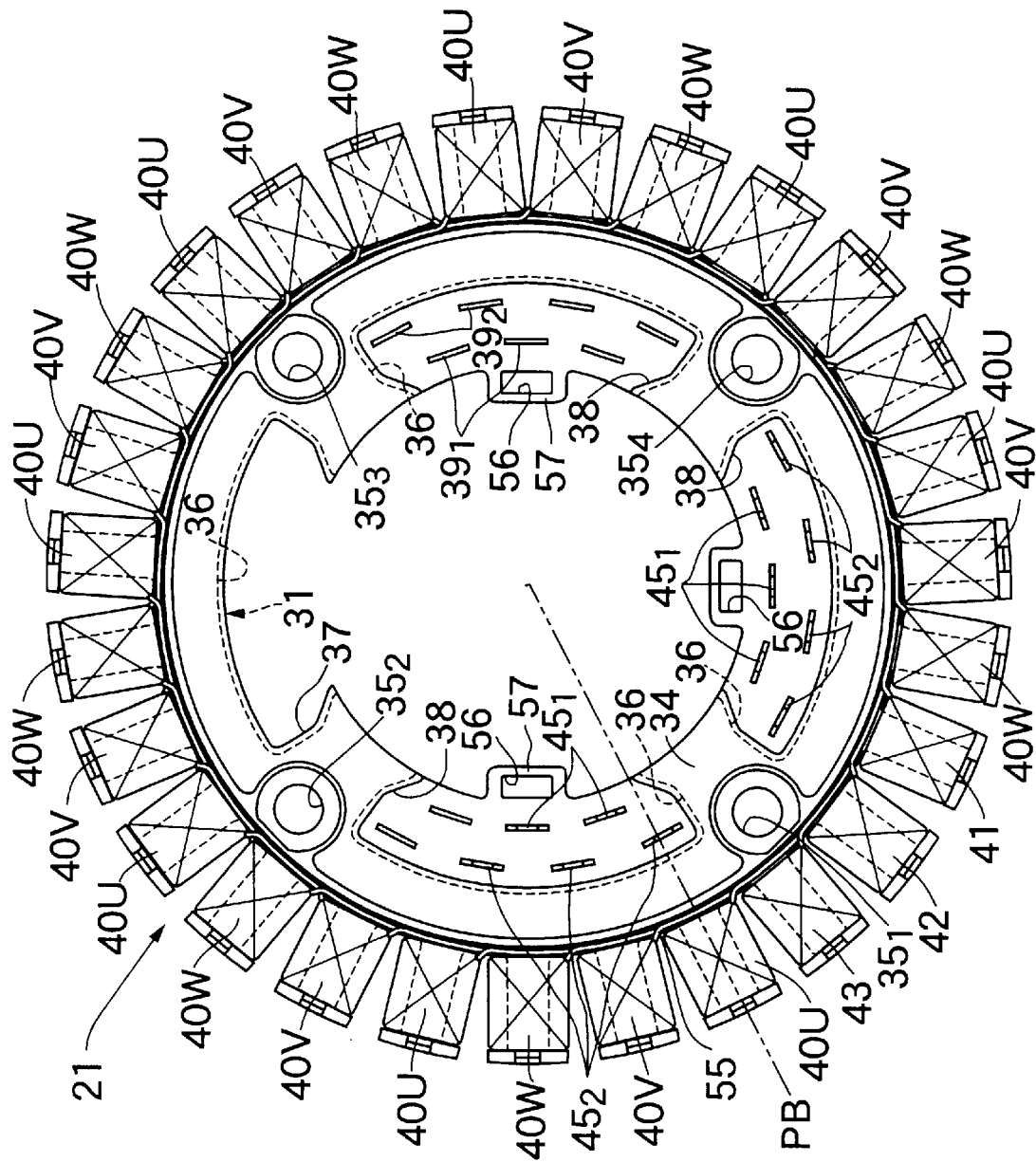

Referring also to FIGS. 2 and 3, first, second, third and fourth insertion bores $35_1$, $35_2$, $35_3$ and $35_4$ are provided in the core base portion 32 and the bobbin 34 at a plurality of, e.g., four points at equal distances spaced apart in a circumferential direction. The bolts 23 for fastening the stator 21 to the sleeve 22 are inserted through the insertion bores $35_1$, $35_2$, $35_3$ and $35_4$.

Figure 4:
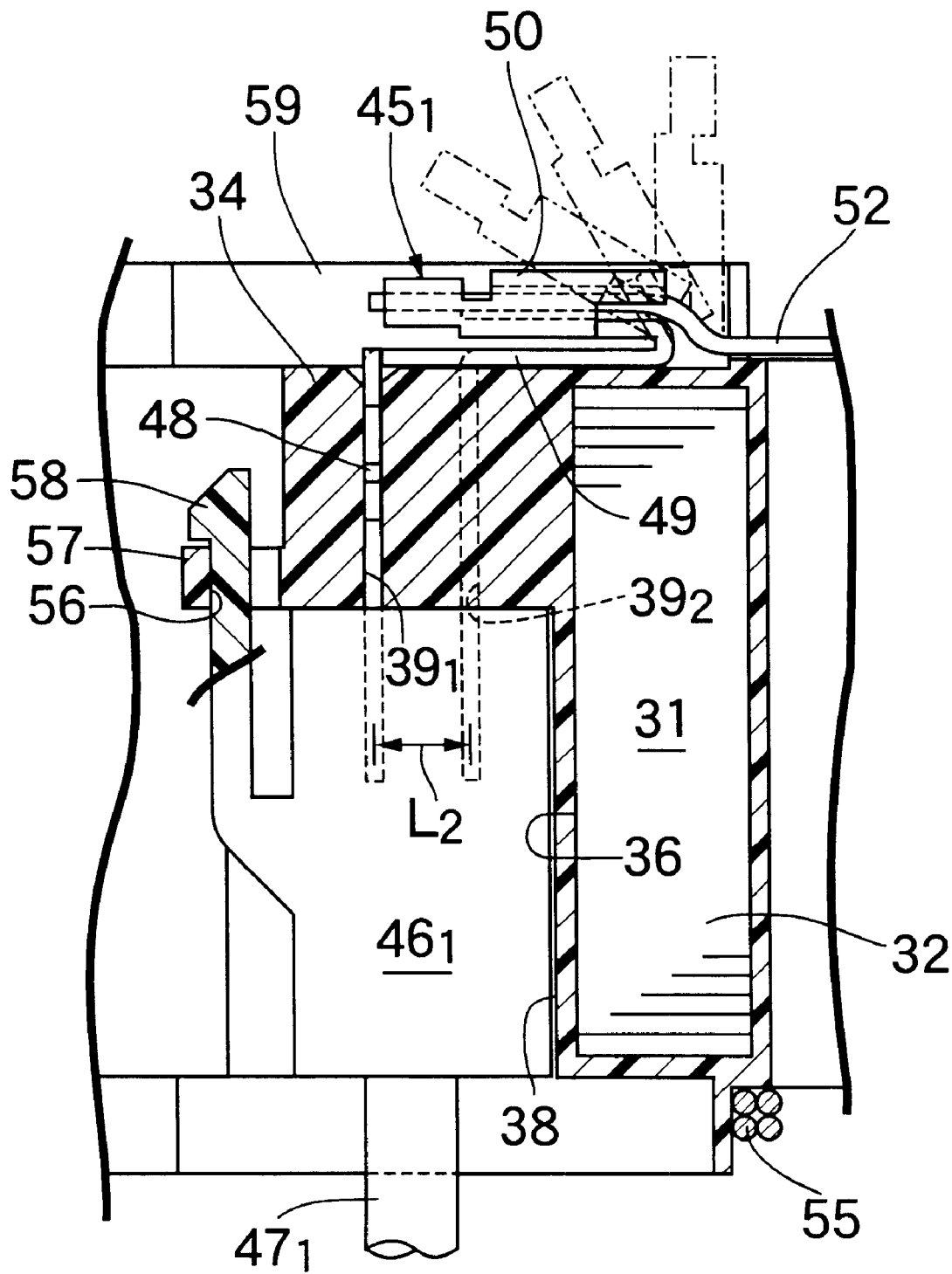

Referring also to FIG. 4, four grooves 36 are provided in the inner periphery of the core base portion 32 of the stator core 31 over between axially opposite ends of the core base portion 32 between the first, second, third and fourth $35_1$, $35_2$, $35_3$ and $35_4$. A groove 37 with its axially opposite ends opened is defined in the inner periphery of the bobbin 34 at a location corresponding to the groove 36 between the second and third insertion bores $35_2$ and $35_3$ to cover such groove 36. Recesses 38 with its portion adjacent the cover 30 and its radially inner portion being opened, are defined in the bobbin 34 at locations corresponding to the groove 36 between the first and second insertion bores $35_1$ and $35_2$, the groove 36 between the third and fourth insertion bores $35_3$ and $35_4$ and the groove 36 between the fourth and first insertion bores $35_4$ and $35_1$.

Inside the coils 40U, 40V, 40W and 41 to 43, the following fitting bores are provided at locations corresponding to the recesses 38 of the bobbin 34: a plurality of, e.g., three first fitting bores $39_1$ which are disposed at equal distances in a circumferential direction of the bobbin 34 at locations spaced apart at the same distance from the center of the bobbin 34; and a plurality of, e.g., four second fitting bores $39_2$ which are disposed alternately with the first fitting bores $39_1$ along the circumferential direction of the bobbin 34 at locations spaced apart at a distance larger than that of the first fitting bores $39_1$ from the center of the bobbin 34. The fitting bores $39_1$ and $39_2$ are defined to have a rectangular cross-sectional shape longer in a direction perpendicular to the radial direction of the bobbin 34. One end of each of the fitting bores $39_1$ and $39_2$ opens to face the recesses 38, and the other ends of the fitting bores $39_1$ and $39_2$ open into that end face of the bobbin 34, which faces the rotor yoke 27.

In such stator core 31, if the protruding pole 33 at a reference position PB established in the vicinity of the first insertion bore $35_1$ is defined as being first, eight U-phase main coils 40U, eight V-phase main coils 40V and eight W-phase main coils 40W are wound around first to 24-th (in a counterclockwise direction in FIG. 2, which is in a clockwise direction in FIG. 3, protruding poles 33 through the bobbin 34, and a charge coil 41, a subsidiary coil 42 and a DC coil 43 are wound around each of the 25-th to 27-th protruding poles 33.

Each of the U-phase main coils 40U is wound around each of the first, fourth, seventh, tenth, 13-th, 16-th, 19-th and 22-nd protruding poles 33 through the bobbin 34. Each of the V-phase main coils 40V is wound around each of the protruding poles 33 disposed at locations adjacent the U-phase main coils 40U in the counterclockwise direction in FIG. 2 through the bobbin 34. Each of the W-phase main coils 40W is wound around each of the protruding poles 33 each located between each of the U-phase main coils 40 and each of the V-phase main coils 40V through the bobbin 34.

Figure 5:
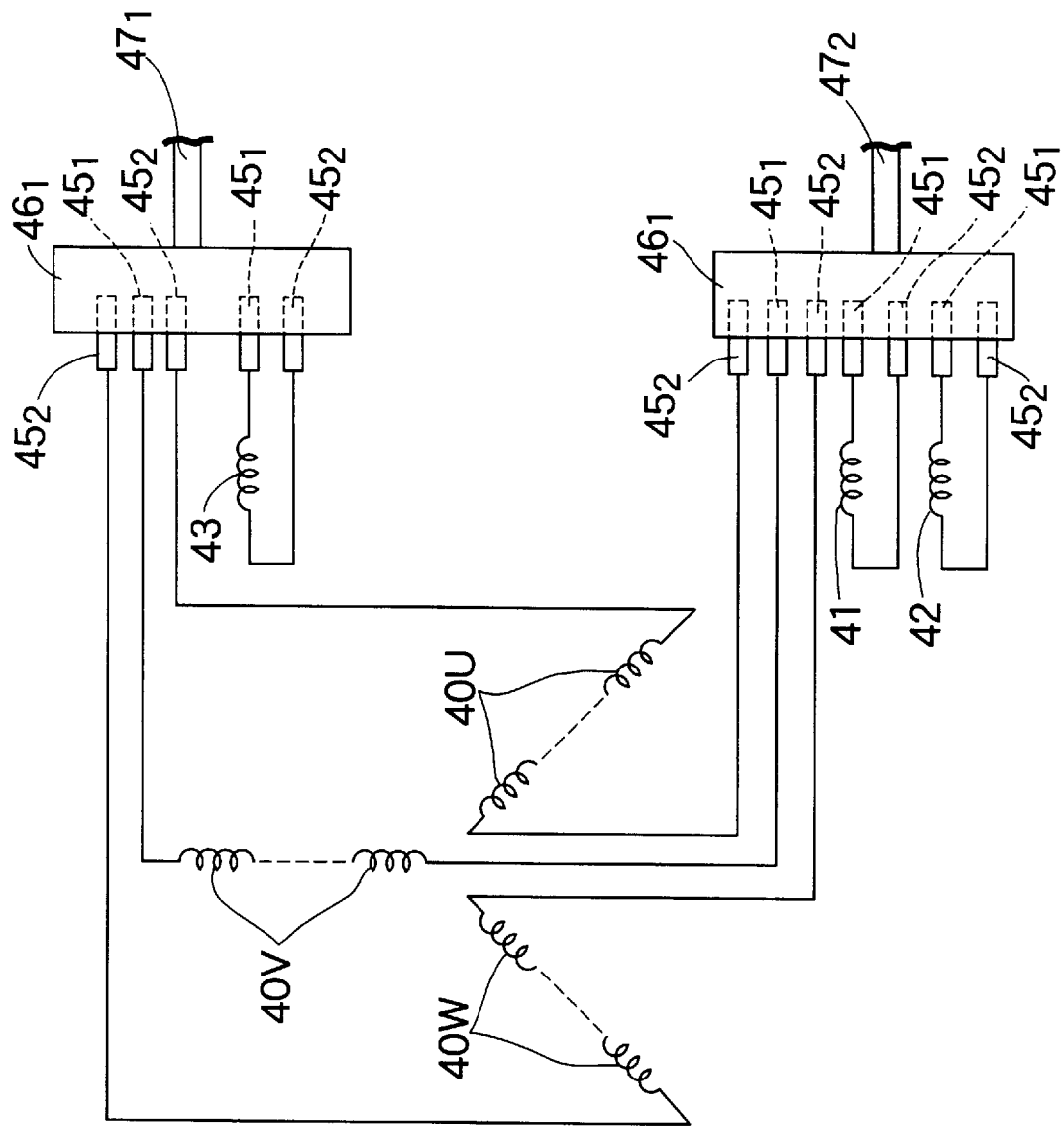

Referring to FIG. 5, one end of the eight U-phase main coils 40U connected in series, i.e., one end of the U-phase main coil 40<u>U</u> disposed at the reference position PB is connected to a second connecting terminal $45_2$. One end of the eight V-phase main coils 40V connected in series, i.e., one end of the second V-phase main coil 40V from the reference position PB is connected to a first connecting terminal $45_1$. One end of the eight W-phase main coils 40W connected in series, i.e., one end of the third W-phase main coil 40W from the reference position PB is connected to the second connecting terminal. Opposite ends of the DC coil 43 are connected to the first and second connecting terminals $45_1$ and $45_2$.

The first and second connecting terminals $45_1$ and $45_2$ connected to one end of each of the main coils 40U, 40V and 40W connected in series and to the opposite ends of the DC coil 43 in the above manner are fitted and fixed in the bobbin 34 at a portion corresponding to the recess 38 between the first and second insertion bores $35_1$ and $35_2$. The two first connecting terminals $45_1$ are fitted in the first fitting bores $39_1$ nearer to the first insertion bore $35_1$, and the three second connecting terminals $45_2$ are fitted in the second fitting bores $39_2$ nearer to the first insertion bore $35_1$. Moreover, a coupler $46_1$ is detachably fitted in the recess 38 between the first and second insertion bores $35_1$ and $35_2$. The two first connecting terminals $45_1$ and the three second connecting terminals $45_2$ facing the recess 38 between the first and second insertion bores $35_1$ and $35_2$ are commonly connected to the coupler $46_1$, and an external conductor $47_1$ is extended from the coupler $46_1$.

The other end of the eight U-phase main coils 40U connected in series, i.e., one end of the U-phase main coil 40U disposed 22-nd from the reference position PB is connected as a neutral point to the second connecting terminal $45_2$. The other end of the eight V-phase main coils 40V connected in series, i.e., the other end of the 23-rd V-phase main coil 40V from the reference position PB is connected as a neutral point to the first connecting terminal $45_1$. The other end of the eight W-phase main coils 40W, i.e., the other end of the 24-th W-phase main coil 40W from the reference position PB is connected as a neutral point to the second connecting terminal $45_2$. The opposite ends of the charge coil 41 and the opposite ends of the subsidiary coil 42 are connected to the first and second connecting terminals $45_1$ and $45_2$, respectively.

The first and second connecting terminals $45_1$ and $45_2$ connected to the neutral points of the main coils 40U, 40V and 40W and the opposite ends of the charge coil 41 and the subsidiary coil 42 are fitted and fixed in the bobbin 34 at a portion corresponding to the recess 38 between the fourth and first insertion bores $35_4$ and $35_1$. The first connecting terminals $45_1$ are fit ted in the first fitting bores $39_1$, respectively, and the second connecting terminals $45_2$ are fitted in the second fitting bores $39_2$, respectively. Moreover, a coupler $46_2$ is detachably fitted in the recess 38 between the fourth and first insertion bores $35_4$ and $35_1$. The first connecting terminals $45_1$ and the second connecting terminals $45_2$ facing the recess 38 between the fourth and first insertion bores $35_4$ and $35_1$ are commonly connected to the coupler $46_2$, and an external conductor $47_2$ are extended from the coupler $46_2$.

The first and second connecting terminals $45_1$ and $45_2$ are not fitted in all of the first and second fitting bores $39_1$ and $39_2$ disposed in correspondence to the recess 38 between the third and fourth insertion bores $35_3$ and $35_4$, as well as in some of the first and second fitting bores $39_1$ and $39_2$ disposed in correspondence to the recess 38 between the first and second insertion bores $35_1$ and $35_2$. However, the fitting of the first and second connecting terminals $45_1$ and $45_2$ in the pluralities of fitting bores $39_1$ and $39_2$ is properly selected depending upon the type of the generator. In another type of a generator, the first and second connecting terminals $45_1$ and $45_2$ may be fitted in all of the fitting bores $39_1$ and $39_2$.

Figure 6:
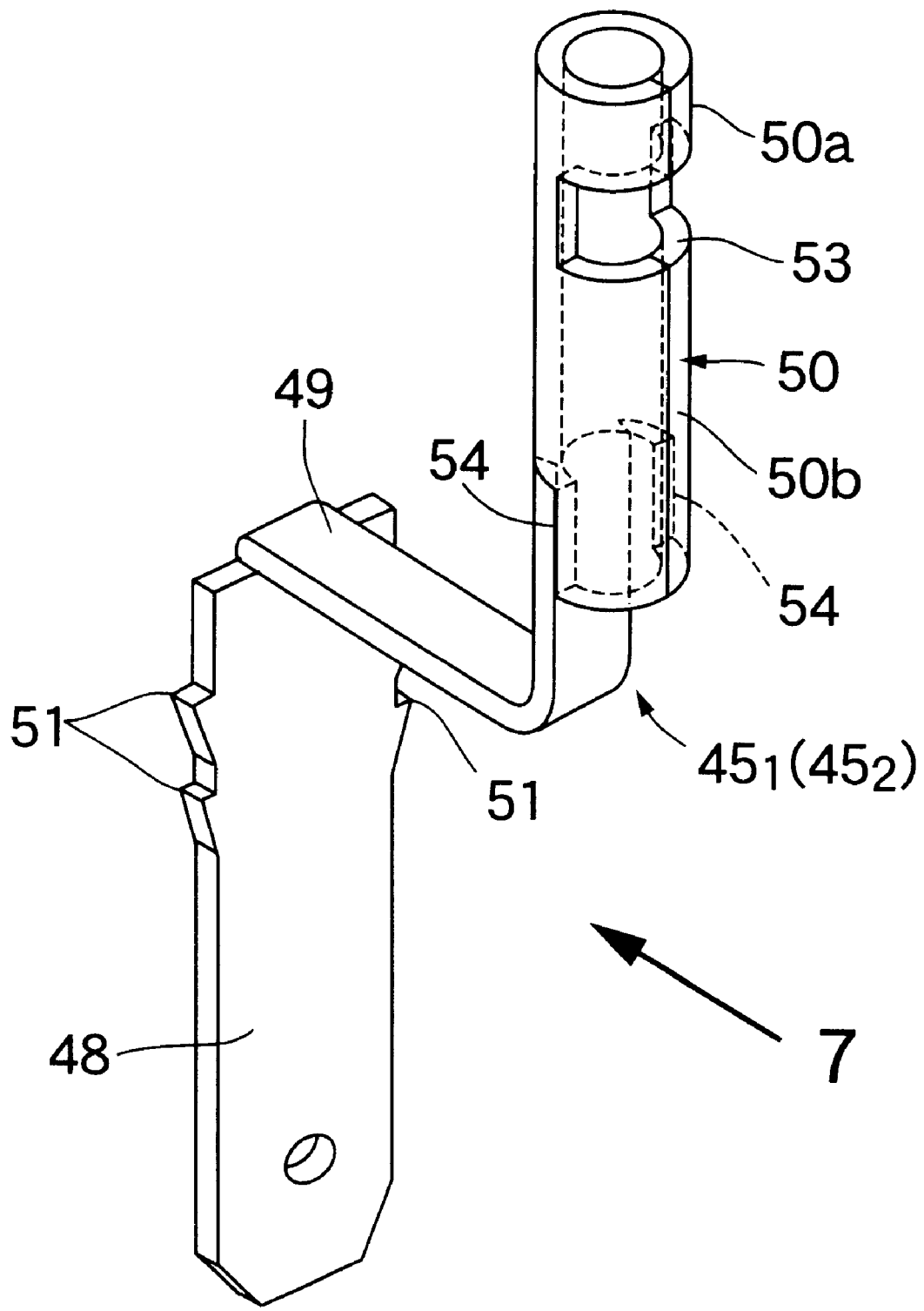
Figure 7:
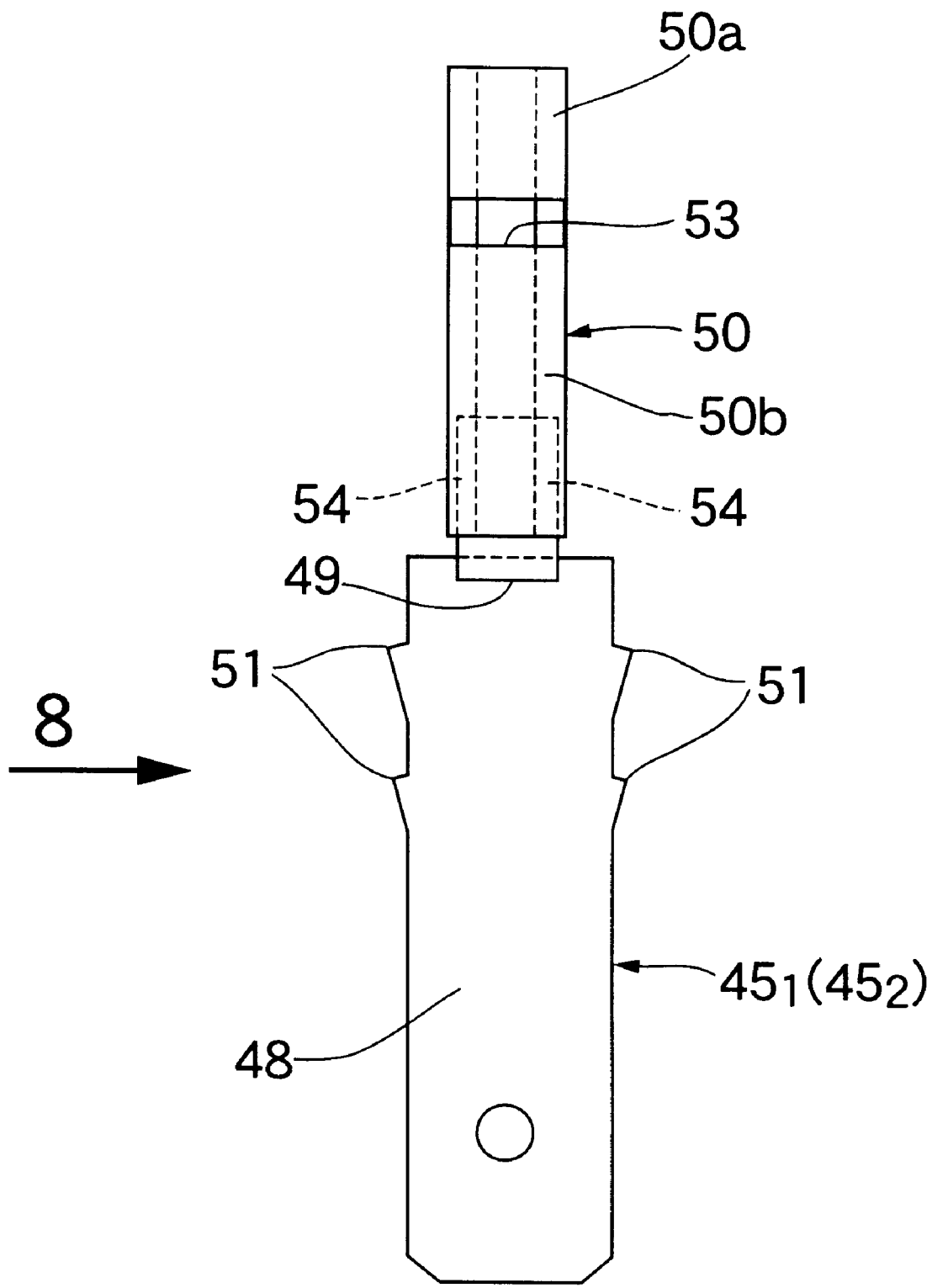
Figure 8:
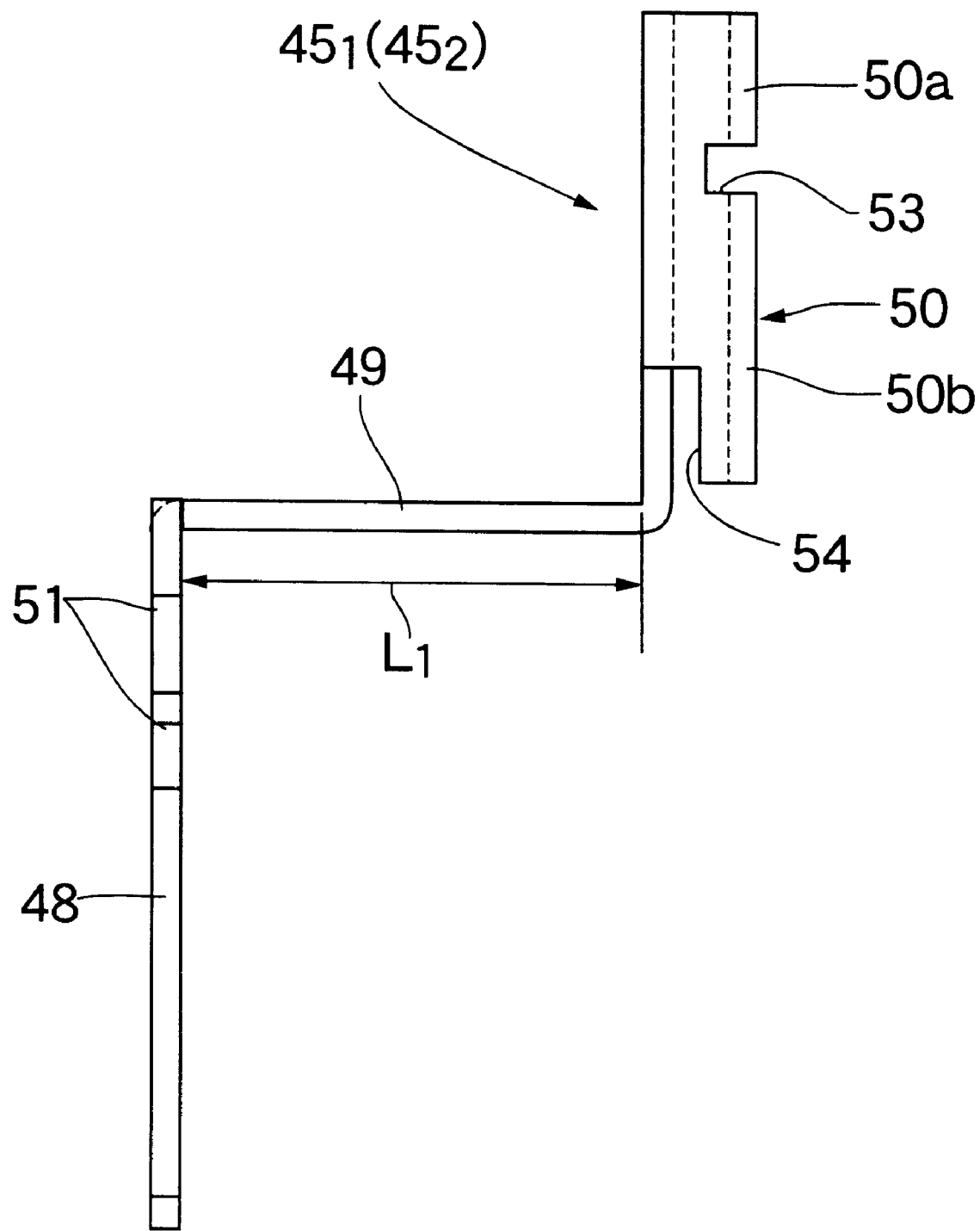

Referring to FIGS. 6 to 8, the first connecting terminal $45_1$ is made of a conductive metal and integrally includes an external-conductor connecting terminal section 48 which is fitted and fixed in the first fitting bore $39_1$ with one end protruding from the first fitting bore $39_1$, a flat plate-shaped connecting plate section 49 connected at one end at right angles to the other end of the external-conductor connecting terminal section 48, and a coil connecting terminal section 50 connected to the other end of the connecting plate section 49. Before assembling into the stator 21, the coil connecting terminal section 50 is connected at right angles to the connecting plate section 49 in a direction opposite from the external-conductor connecting terminal section 48, i.e., in a direction away from the bobbin 34 during fitting of the external-conductor connecting terminal section 48 into the first fitting bore $39_1$, but the coil connecting terminal section 50 may be folded, so that it is superposed on the connecting plate section 49.

The external-conductor connecting terminal section 48 is formed into a flat plate-shape so as to be fitted into the first fitting bore $39_1$, and is formed at a length such that one end protrudes from the first fitting bore $39_1$ when the connecting plate section 49 is fitted into the first fitting bore $39_1$, until it abuts against the bobbin 34, as shown in FIG. 4. Moreover, a pair of claws 51 are provided on each of opposite sides of the external-conductor connecting terminal section 48 to bite into inner surfaces of the opposite sides of the first fitting bore $39_1$ to inhibit the releasing of the external-conductor connecting terminal section 48 out of the fitting bore $39_1$.

The connecting plate section 49 is connected at right angles to the other end of the external-conductor connecting terminal section 48, so that when the external-conductor connecting terminal section 48 is fitted into the first fitting bore $39_1$, the connecting plate section 49 abuts against the end face of the bobbin 34 adjacent the rotor yoke 27 and extends outwards radially of the stator 21. The connecting plate section 49 is formed with a width smaller than that of the external-conductor connecting terminal section 48.

The coil connecting terminal section 50 is formed into a cylindrical shape by rounding a flat plate. Lead wires 52 (see FIGS. 2 and 4) extending the coils 40U, 40V and 40W, 41, 42 and 43 can be inserted through the coil connecting terminal section 50. Moreover, the lead wires 52 inserted through the coil connecting terminal section 50 are connected to the other end, i.e., the tip end of the coil connecting terminal section 50 by fusing. A window 53 is provided in a notched manner at an intermediate portion of the coil connecting terminal section 50 to face outwards of the stator 21. The coil connecting terminal section 50 is provided with a connecting portion 50a adjacent a tip end, and an introducing portion 50b adjacent the connecting plate section 49 for insertion of the lead wires 52 therethrough toward the connecting portion 50a. The connecting portion 50a and the introducing portion 50b are formed to sandwich the window 53 therebetween.

Notches 54 are provided on opposite sides of the coil connecting terminal section 50 at a connection to the connecting plate section 49, respectively, and the flat plate-shaped connecting plate section 49 is smoothly connected with the cylindrical coil connecting terminal section 50 without any sudden change in shape by the aid of the notches 54.

The second connecting terminal $45_2$ fitted in the second fitting bore $39_2$ has basically the same shape as the first connecting terminal $45_1$, but the length $L_1$ of the connecting plate section 49 in the first connecting terminal $45_1$ is set larger than the length $L_1$ of the connecting plate section 49 in the second connecting terminal $45_2$. The difference between the length $L_1$ of the connecting plate section 49 in the first connecting terminal $45_1$ and the length $L_1$ of the connecting plate section 49 in the second connecting terminal $45_2$ is a value equal to a distance $L_2$ (see FIG. 4) between the first and second fitting bores $39_1$ and $39_2$ in the radial direction of the bobbin 34. By setting the lengths $L_1$ and the distance $L_2$ in the above manner, the coil connecting terminal section 50 of the first connecting terminal $45_1$ having the external-conductor connecting terminal section 48 fitted in the first fitting bore $39_1$ and the coil connecting terminal section 50 of the second connecting terminal $45_2$ having the external-conductor connecting terminal section 48 fitted in the second fitting bore $39_2$ are disposed at locations spaced apart at equal distances from the center of bobbin 34.

A plurality of ribs 59 are projectingly integrally provided on the bobbin to extend in the radial direction of the bobbin 34 between the fitting bores $39_1$ and $39_2$, and are adapted to guide the coil connecting terminal sections 50 of the first and second connecting terminals $45_1$ and $45_2$, when the coil connecting terminal sections 50 are folded.

To assemble the first and second connecting terminals $45_1$ and $45_2$ with the stator 21 and to connect the lead wires 52 to the first and second connecting terminals $45_1$ and $45_2$, the external-conductor connecting terminal sections 48 are press-fitted into the first and second fitting bores $39_1$ and $39_2$ in a state in which the lead wires 52 have been inserted through the introducing portions 50b and the connecting portions 50a. Then, the lead wires 52 are connected to the connecting portions 50a by fusing and thereafter, the coil connecting terminal sections 50 are folded so that they are superposed onto the connecting plate sections 49.

The couplers $46_1$ and $46_2$ fitted in the recesses 38 are commonly and detachably connected to one end of each of the external-conductor connecting terminal sections 48 protruding toward the recesses 38 in the connecting terminals 45$_1$ and 45$_2$. Engage claws 58 provided on the couplers 46$_1$ and 46$_2$ are brought into resilient engagement into engage bores 56 in an engage portion 57 integrally provided on an inner periphery of the bobbin 34, thereby inhibiting the releasing of the couplers 46$_1$ and 46$_2$ out of the recesses 38.

Crossover wires 55 connecting the U-phase main coils 40U to one another, the V-phase main coils 40V to one another as well as the W-phase main coils 40W to one another are disposed on the opposite side from the side of disposition of the terminals 45$_1$ and 45$_2$, i.e., on the side of the rotor yoke 27, so that they are wound around the bobbin 34, as shown in FIGS. 3 and 4.

The operation of the first embodiment will be described below. In the first and second connecting terminals 45$_1$ and 45$_2$ fitted and fixed in the fitting bores 39$_1$ and 39$_2$ in the bobbin 34, the lead wires 52 are connected to the connecting portions 50a lying at a position relatively spaced apart from the bobbin 34 by fusing in the state in which the lead wires 52 from the coils 40U, 40V, 40W, 41, 42 and 43 have been inserted through the coil connecting terminal portions 50 which are perpendicular to the connecting plate sections 49. Therefore, even if each of the coils 40U, 40V, 40W, 41, 42 and 43 is formed from a magnet wire, the connection of the coils 40U, 40V, 40W, 41, 42 and 43 to the terminals 45$_1$ and 45$_2$ can be easily carried out without an operation for peeling off an insulating skin. Thus, the connecting operation can be easily performed, and the number of operating steps can be reduced.

After connection of the lead wires 52, the coil connecting terminal section 50 can be folded, so that it is superposed onto the connecting plate section 49. Therefore, the protrusion of the coil connecting terminal section 50 from the stator 21 can be avoided, whereby the space for disposition of the connecting terminals 45$_1$ and 45$_2$ can be reduced in size.

Moreover, since the first and second connecting terminals 45$_1$ and 45$_2$ adjacent in the circumferential direction of the bobbin 34 are fitted and fixed in the fitting bores 39$_1$ and 39$_2$ at the locations displaced from one another in the radial direction of the bobbin 34, the pluralities of connecting terminals 45$_1$ and 45$_2$ can be fitted and fixed in a compact manner in the bobbin 34, thereby reducing the size of the stator 21. In addition, the first and second connecting terminals 45$_1$ and 45$_2$ are fitted and fixed in the bobbin 34 at the locations spaced apart at the different distances from the center of the bobbin 34, wherein the coil connecting terminal sections 50 of the terminals 45$_1$ and 45$_2$ are disposed at the same distance from the center of the bobbin 34 in the state in which they are perpendicular to the connecting plate sections 49. Therefore, when the coil connecting terminal sections 50 are to be folded after connection of the lead wires 52 to the coil connecting terminal sections 50, an urging force in a folding direction may be applied to the coil connecting terminal sections 50 at the locations spaced apart at the same distance from the center of the bobbin 34. Thus, the urging means for applying the urging force in the folding direction to the coil connecting terminal sections 50 need not be moved in the radial direction of the bobbin 34, and the urging means may be sequentially moved in circumferential direction of the bobbin 34 and hence, the mechanism for moving the urging means can be simplified.

The connecting portion 50a for connecting the lead wires 52 by fusing and the introducing portion 50b for insertion of the lead wires 52 therethrough are formed on the coil connecting terminal section 50 to sandwich the window 53 facing outwards of the stator 21 therebetween. Therefore, when the coil connecting terminal section 50 is folded, the introducing portion 50b is pushed, and a stress produced during folding is prevented from being applied to the connecting portion 50a to which the lead wires 52 have been connected. Thus, the connection of the coil connecting terminal section 50 and the lead wire 52 can be reliably maintained despite the folding.

The notches 54 are provided on the opposite sides of the coil connecting terminal section 50 at the connection to the connection plate section 49 and hence, the coil connecting terminal section 50 can be folded, so that it is not crushed. Thus, the coil connecting terminal section 50 can be easily folded, and the coil connecting terminal section 50 can be prevented from being crushed, whereby a large load can be prevented from being applied to the lead wire 52 by the prevention of the crushing.

Further, the plurality of ribs 59 are projectingly provided on the bobbin 34 and disposed between the fitting bores 39$_1$ and 39$_2$ to extend in the radial direction of the bobbin 34. The ribs 59 function as guides, when the coil connecting terminal sections 50 of the terminals 45$_1$ and 45$_2$ having the external-conductor connecting terminal sections 48 fitted in the fitting bores 39$_1$ and 39$_2$, respectively. Therefore, it is possible to reliably avoid the contacting of the connecting terminals 45$_1$ and 45$_2$ adjacent in the circumferential direction of the bobbin 34 with each other. Thus, it is not required that the connecting terminals 45$_1$ and 45$_2$ are spaced apart at a large distance from each other, and it is possible to prevent an increase in size of the stator 21 due to the disposition of the connecting terminals 45$_1$ and 45$_2$.

In addition, the recesses 38 are provided in the bobbin 34, so that one ends of the external-conductor connecting terminal sections 48 can face the recesses, and the couplers 46$_1$ and 46$_2$ commonly and detachably connected to one ends of the plurality of external-conductor connecting terminal sections 48 are fitted and accommodated in the recesses 38. Thus, it is unnecessary to ensure a large space sideways of the stator 21 in order to connect the connecting terminals 45$_1$ and 45$_2$ with the couplers 46$_1$ and 46$_2$, and the connections to the external conductors 47$_1$ and 47$_2$, i.e., to the couplers 46$_1$ and 46$_2$ can be made compact. Moreover, by the fitting and accommodation of the couplers 46$_1$ and 46$_2$ in the recesses 38, the vibration of the couplers 46$_1$ and 46$_2$ caused by the vibration of the engine can be prevented, whereby the connection of the couplers 46$_1$ and 46$_2$ and the terminals 45$_1$ and 45$_2$ can be reliably maintained.

In the first embodiment, crossover wires 55 connecting the U-phase main coils 40U to one another, the V-phase main coils 40V to one another as well as the W-phase main coils 40W to one another have been disposed on the opposite side from the side of disposition of the terminals 45$_1$ and 45$_2$. As in a second embodiment shown in FIG. 9, the crossover wires 55 may be disposed on the side of disposition of the connecting terminals 45$_1$ and 45$_2$, and the lead wires 52 may extend astride the crossover wires 55. In this case, the potentials of the crossover wires 55 and the lead wires 52 are different from each other and hence, it is desirable that the lead wires 52 are protected by a varnish, a glass tube or the like.

Although the embodiments of the present invention have been described in detail, it will be understood that the present invention is not limited to the above-described embodiments, and various modifications in design may be made without departing from the spirit and scope of the invention defined in claims.

For example, the present invention is applicable widely not only to the stator for the outer rotor-type multi-pole generator, but also to a stator for a rotating electric machine in which connecting terminals for connecting coils and an external conductor are fitted and fixed in fitting bores in a bobbin. The coil connecting terminal section is not limited to the cylindrical shape, and may be of a tubular shape with a quadrilateral cross section.

What is claimed is:

1. A connecting terminal for a stator, said connecting terminal being fitted and fixed in a fitting bore provided in a bobbin included in the stator for connection between a coil of said stator and an external-conductor, said connecting terminal comprising an external-conductor connecting terminal section fitted and fixed in the fitting bore with one of opposite ends thereof connected to said external conductor protruding from the fitting bore, a flat plate-shaped connecting plate section connected at one of opposite ends thereof at right angles to the other end of said external-conductor connecting terminal section and extending outwards in a radial direction of the stator, and a coil connecting terminal section which extends away from the bobbin and which is connected at right angles to the other end of said connecting plate section, so that said coil connecting terminal section can be folded to a position superposed onto said connecting plate section, said coil connecting terminal section being formed into a tubular shape, so that a lead wire extending from the coil can be inserted through said coil connecting terminal section and can be connected to a tip end of said coil connecting terminal section by fusing.

2. A connecting terminal for a stator according to claim 1, wherein said coil connecting terminal section includes a connecting portion on its tip end side for connecting said lead wire by fusing, and an introducing portion for insertion of said lead wire therethrough toward said onnecting portion, said connecting portion and said introducing portion being formed on said coil connecting terminal section with a window facing outwards of said stator being interposed therebetween.

3. A connecting terminal for a stator according to claim 1, further including notches provided on opposite sides of said coil connecting terminal section at a connection to said connection plate section.

4. A connecting terminal for a stator according to claim 2, further including notches provided on opposite sides of said coil connecting terminal section at a connection to said connection plate section.

* * * * *